United States Patent [19]

Mullins et al.

[11] Patent Number: 6,166,161
[45] Date of Patent: Dec. 26, 2000

[54] INCORPORATION OF FUNCTIONALIZED COMONOMERS IN POLYOLEFINS

[75] Inventors: Michael J. Mullins, Lake Jackson, Tex.; Jorge Soto; Peter N. Nickias, both of Midland, Mich.

[73] Assignee: The Dow Chemical Company, Midland, Mich.

[21] Appl. No.: 08/873,378

[22] Filed: Jun. 12, 1997

Related U.S. Application Data

[60] Provisional application No. 60/020,492, Jun. 24, 1996.

[51] Int. Cl.$^7$ .................................................. C08F 12/12
[52] U.S. Cl. ....................... 526/346; 526/160; 526/943; 526/279; 526/133; 525/329.3
[58] Field of Search .................... 526/160, 943, 526/279, 133, 346; 525/329.3

[56] References Cited

U.S. PATENT DOCUMENTS

| | | | |
|---|---|---|---|
| 3,477,991 | 11/1969 | Patton et al. | 260/47 |
| 3,856,765 | 12/1974 | Collette et al. | 260/80.73 |
| 4,170,589 | 10/1979 | Goeke et al. . | |
| 4,260,533 | 4/1981 | Iacoviello et al. | 260/29.6 |
| 4,423,196 | 12/1983 | Arit et al. | 526/72 |
| 4,521,566 | 6/1985 | Galli et al. | 525/247 |
| 4,853,426 | 8/1989 | Chatterjee . | |
| 5,017,727 | 5/1991 | Olivier | 568/719 |
| 5,064,878 | 11/1991 | Chatterjee . | |
| 5,077,327 | 12/1991 | Cecchin et al. | 524/68 |
| 5,147,950 | 9/1992 | Kelsey | 526/134 |
| 5,157,164 | 10/1992 | Olivier | 568/719 |
| 5,248,737 | 9/1993 | Sivak et al. | 525/384 |
| 5,252,677 | 10/1993 | Tomita et al. | 525/333.9 |
| 5,274,060 | 12/1993 | Schädeli . | |
| 5,294,679 | 3/1994 | Sivak et al. | 525/326.5 |
| 5,296,262 | 3/1994 | Sivak et al. | 556/482 |
| 5,296,433 | 3/1994 | Siedle et al. | 502/117 |
| 5,296,562 | 3/1994 | Sivak et al. | 525/367 |
| 5,329,037 | 7/1994 | Sivak et al. | 556/464 |
| 5,332,781 | 7/1994 | Eldin et al. | 525/65 |
| 5,336,745 | 8/1994 | Cheradame et al. | 526/347.1 |
| 5,350,786 | 9/1994 | Costanzi et al. . | |
| 5,367,090 | 11/1994 | Sivak et al. | 556/443 |
| 5,373,061 | 12/1994 | Sivak et al. | 525/326.5 |
| 5,416,177 | 5/1995 | Siedle et al. | 526/126 |
| 5,444,125 | 8/1995 | Tomato et al. | 515/293 |
| 5,534,595 | 7/1996 | Asanuma et al. | 525/326.5 |
| 5,547,675 | 8/1996 | Canich . | |
| 5,552,489 | 9/1996 | Merrill et al. | 525/210 |
| 5,554,775 | 9/1996 | Krishnamurti et al. | 556/7 |

FOREIGN PATENT DOCUMENTS

| | | | |
|---|---|---|---|
| 0 363 990 A2 | 4/1990 | European Pat. Off. | C08F 230/06 |
| 0 695 733 | 2/1996 | European Pat. Off. . | |
| 0 703 249 A1 | 3/1996 | European Pat. Off. | C08F 30/08 |
| 1 947 590 | 9/1968 | Germany . | |
| 44 33 481 A1 | 9/1994 | Germany | C08F 30/08 |
| 44-014934 | 3/1969 | Japan . | |
| 88/08856 | 11/1988 | WIPO | C08F 30/08 |
| 95/27744 | 10/1995 | WIPO . | |

OTHER PUBLICATIONS

Wilen et al., "Copolymerization of Ethylene and 6–tert–Butyl–2–(1,1–dimethylhept–6–enyl)–4–methylphenol over Three Different Metallocene–Alumoxane Catalyst Systems", *Macromolecules*, vol. 29, No. 27, pp. 8569–8575 (1996).

Aaltonen et al., "Synthesis of Hydroxyl Group Containing Polyolefins with Metallocene/Methylaluminoxane Catalysts", *Macromolecules*, vol. 29, pp. 5255–5260 (1996).

Soga et al., "Stereospecfic Polymerization of Methyl Methacrylate Initiated by Dimethylzirconocene/B($C_6F_5$)$_3$ (or Ph$_3$CB($C_6F_5$)$_4$)/Zn ($C_2H_5$)$_2$", *Macromolecules*, vol. 27, pp. 7938–7940 (1994).

Wang et al., "Carbocationic Initiation of Polymerization of Vinyl Ethers and N–Vinylcarbazole Induced by ($\eta^5$–$C_5Me_5$) TiMe$_2$($\mu$–Me)B($C_6F_5$)$_3$. The First Examples of Polymerization of This Class of Electron–Rich Olefins by a Metallocene–like Initiator", *Macromolecules*, vol. 28, pp. 8021–8027 (1995).

H. W. Young et al., "Preparation of Ethylene–Propylene Copolymers and EPDM Containing a Polymerizable Antioxidant", *ACS Polymer Preprints*, vol. 33, No. 1, (1992).

C. Wilén et al., "Copolymerization of propylene and 4–(ω–aklenyl)–2,6–di–t–butylphenol over a supported high–activity Ziegler–Natta catalyst", *Polyme*, vol. 33, No. 23, pp. 5049–5055 (1992).

C. Wilén, "Polar Activation in Copolymerization of Propylene and 6–tert–Butyl–2–2–(1,1–dimethylhept–6–enly)–4–methylphennol over a Racemic 1,1'–(Dimethylsilylene)–bis($\eta^5$–4,5,6,7–tetrahydro–1–indenyl) zirconium Dichloride/Methylalaumoxane Catalyst System", *Macromolecules*, vol. 27, pp. 4051–4057, (1994).

Fischer et al., "Donor–and Acceptor–Modified Metallocene–Based Homogeneous Ziegler–Natta Catalysts", *Makromol. Chem., Macromol. Symp.*, vol. 66, pp. 191–202 (1993).

Kesti et al., "Homogeneous Ziegler–Natta Polymerization of Functionalized Monomers Catalyzed by Cationic Group IV Metallocenes", *J. Am. Chem. Soc.*, vol. 114, pp. 9679–9680 (1992).

Derwent Abstract No. 86–115514/18 for JP 61–055103.

*Primary Examiner*—David W. Wu
*Assistant Examiner*—Ling-Siu Choi

[57] ABSTRACT

This invention relates to copolymers from alpha-olefins, especially ethylene and propylene, and hindered allyl phenols (and other heteroatom-containing olefins) using Ziegler catalysts. New polyolefin compositions containing reactive groups can be prepared from this process. These copolymers have improved coatability and blending characteristics.

15 Claims, No Drawings

INCORPORATION OF FUNCTIONALIZED COMONOMERS IN POLYOLEFINS

This application claims the benefit of U.S. Provisional Application Ser. No. 60/020,492 filed Jun. 24, 1996, which is incorporated herein in its entirety.

This invention relates to olefin polymerization, more specifically polymerization of olefins with functionalized comonomers using transition metal catalysts. This invention also relates to conversion of the functionalized copolymers to new polyolefin compositions with reactive pendant groups.

BACKGROUND OF THE INVENTION

The production of polyolefins using single-site transition metal catalysts is rapidly becoming dominant in the industry. The advantages of these catalysts over traditional Ziegler catalysts are primarily that the molecular weight dispersity is relatively narrow, and for polyethylene, that long-chain branching can be obtained. In the case of propylene, styrene, and other higher olefins, the tacticity of the polymers can be controlled, leading to varying amounts of crystallinity. The polymers produced from single-site catalysts are therefore highly valued in the marketplace.

For many applications, such as blending, dyeing, and improving paintability, it would be desirable to incorporate polar comonomers to improve the wetability and compatibility of the surface. Polar comonomers which contain heteroatoms with at least one hydrogen are especially desirable, as the possibilities for hydrogen bonding and nucleophilic reactions to improve adhesion are increased. A drawback of all single-site transition metal catalysts as well as heterogeneous Ziegler catalysts is that they are notoriously sensitive to non-hydrocarbons, especially those with heteroatom-hydrogen groups. Nevertheless, the incorporation of polar comonomers into polyolefins using such catalysts has been reported. For example, Iwata, et al in DE 1,947,590 (1970, assigned to Mitsui Petrochemical Industries Ltd.) used a heterogeneous Ziegler catalyst to copolymerize hindered phenols with olefins. The phenol was pretreated with an equivalent amount of triethyl aluminum (or Et$_2$AlCl) prior to exposure to the catalyst. This forms an aluminum complex which prevents poisoning of the catalyst.

Single-site transition metal catalysts have also been used to incorporate polar comonomers into polyolefins. Wilen and Nasman (Macromolecules 1994, 27, 4051–4057) describe the copolymerization of propylene with alkenyl substituted phenols using a zirconocene dichloride catalyst. Aluminum cocatalysts, methylalumoxane (MAO) or trimethyl aluminum, were used to activate the zirconocene dichloride and to form an aluminum complex of the phenol. The necessity of preforming an aluminum complex is shown in the following quote: "The low activity at low Al/phenol ratios (<4.4) may be attributed to rapid catalyst deactivation in the absence of an excess of free MAO or TMA (Me$_3$Al)."
In another publication by Wilen et al (Polymer 1992, 33(23), 5049–5055) on a similar topic, it is concluded: " . . . it is necessary to pretreat the functional monomer with a protecting group in order to prevent catalyst poisoning during polymerization. Catalyst poisoning was verified by experimental propylene polymerization runs under standard experimental conditions conducted in the presence of 2,6-di-t-butylphenol. As may be anticipated, even a small amount of 2,6-di-t-butylphenol was capable of deactivating most of the Ziegler-Natta polymerization sites as presented in Table 1. On the contrary, when the 2,6-di-t-butylphenol was pretreated with a stoichiometric amount of triethylaluminium to liberate ethane and generate alkylaluminium phenoxide, no severe deactivation of polymerization sites was detected."

The requirement for the use of aluminum reagents to prevent catalyst deactivation has disadvantages which have prevented the commercial application of this technology. Most importantly, for most applications the relatively large amounts aluminum in the copolymer product must be neutralized and removed. This requires that the copolymer be dissolved and treated with acid, a process which adds extra steps and considerable cost to the process. Also, the cost of the aluminum reagents is significant.

In light of these problems, it would be desirable to have a process for incorporation of polar comonomers which contain heteroatom-hydrogen groups into polyolefins without the need for stoichiometric amounts of cocatalyst.

SUMMARY OF THE INVENTION

The present invention advantageously provides incorporation of comonomers containing heteroatom-hydrogen groups into polyolefins without pretreatment or forming derivatives of the comonomer(s); instead, single-site transition metal catalysts and boron-containing cocatalysts are used with functionalized comonomers and olefins.

The invention includes a process comprising the step of contacting an olefin (or mixture of olefins) and at least one functionalized comonomer of Formula 1 in the presence of a single-site transition metal catalyst and a boron-containing cocatalyst under conditions such that the olefin and functionalized comonomer copolymerize.

The invention includes the composition of matter prepared from the above process.

This copolymer composition comprises an olefin (or mixture of olefins) in combination with at least one functionalized comonomer with the following structure:

FORMULA 1

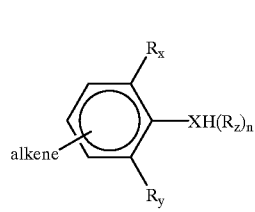

where:
  'alkene' is a group which includes a polymerizable olefin and may include other radicals such as alkyl radicals, aromatic radicals, silyl radicals, or additional aromatic radicals with attached XH(R$_z$)$_n$ groups
  X is a divalent or trivalent heteroatom such as oxygen, nitrogen, or sulfur;
  n is 0 to 1 to satisfy the valency of the heteroatom
  R$_x$ and R$_y$ are independently hydrogen, alkyl or aromatic radicals such as Me, Et, iPr, Lhu, iBu, —CMe$_2$Et, —CMe$_2$Ph, with the proviso that R$_x$ and R$_y$ are not both hydrogen
  R$_z$ is selected from all of the groups included for R$_x$ and R$_y$ as well as silyl groups such as —SiR$_3$ and —Si(OR)$_3$, where R is hydrogen or a hydrocarbyl radical The invention also includes the composition of matter prepared from the above process.

The invention also includes a process (which is applicable to a subset of the above compositions in which the functional comonomer is an ortho alkyl-substituted phenol, ortho alkyl substituted aniline, or ortho alkyl substituted aromatic thiol) including the step of removing a portion of the alkyl groups from the aromatic ring of the pendant functional group attached to the polyolefin. The process includes an additional subsequent step of contacting the resulting polymer with a dealkylation catalyst to remove at least one alkyl group adjacent to (ortho to) the functional group of the Functionalized Comonomer.

The invention also includes applications for this new composition of matter which is obtained from the dealkylation process:

1) blending with other thermoplastics such as polyethylene, polypropylene, poly(urethanes), polycarbonate, polyethylene terephthalate), polyimides, poly(butylene terephthalate, and copolymers of ethylene with vinyl acetate and acrylates such as methyl acrylate, methyl methacrylate, butyl acrylate;

2) use as toughening agents for thermoplastics such as those described above, as well as epoxides, vinyl esters, phenolics, cyanates and other thermosets;

3) use for fabricated articles in which improved capabilities for printing, dyeing, or painting a re required;

4) use as an adhesive for bonding or sealing metals, polymers, or wood;

5) use as a primer for binding polyolefins to paints and other coatings.

DETAILED DESCRIPTION OF THE INVENTION

Practice of the invention is applicable to polyolefins and other addition polymers, that is polymers comprising units derived from olefin monomers (that is monomers containing at least one double bond advantageously olefins having no heteroatom substitutents, hereinafter also Hydrocarbon Olefin Monomers), preferably alpha olefins and cycloalkenes, more preferably wherein the olefin(s) comprise ethylene or propylene, most preferably propylene. Preferred monomers include alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and optionally C10–30-olefins specifically added to the reaction mixture in order to produce relatively long chain branches in the resulting polymers. Preferably, the alpha-olefins are ethylene, propene, 1-butene, 4-methyl-1-pentene, 1-hexene, 1-octene, and combinations of ethylene and/or propene with one or more of such other alpha-olefins. Other preferred monomers include styrene, halo- or alkyl substituted styrenes, vinyl chloride, acrylic tetrafluoroethylene, vinylcyclobutene, 1,4-hexadiene, and methacrylic alkyl esters and substituted amides both of $C_1$ to $C_8$ alcohols or amines, vinyl alkyl ethers of $C_2$ to $C_{10}$ alkyl groups, acrylonitrile, dicyclopentadiene, ethylidene norbornene, and 1,7-octadiene. When alkyl groups have from 1 to about 50 carbon atoms, preferably no more than 30, 10 are preferably, no more than about 10 carbon atoms. Mixtures of the above-mentioned monomers are optionally employed.

Functionalized comonomers (hereinafter also Functionalized Comonomers) are defined for the purpose of this invention as molecules which contain both a polymerizable olefin group (monosubstituted olefin, norbornene, or other strained disubstituted cyclic olefin) and an X—H group, where X is a heteroatom (such as oxygen, nitrogen, or sulfur) and X is sufficiently hindered not to react with a metallocene catalyst. Specific examples of functionalized comonomers are $CH_2\text{=}CHCH_2CH_2NHSiMe_3$, and $CH_2\text{=}CHCH_2CMe_2NHSiMe_3$, which are prepared by silylation of the primary amines (described by House, et al (J. Org. Chem. 1976, 42(5), 855–863) and Walborsky (J. Org. Chem. 1992, 57(23), 6188–6191), 5-trimethylsilylaminonorbornene, 5-trimethylsilylaminomethylnorbornene (prepared by silylation of the amines described by Whitworth and Zutty (U.S. Pat. No. 3,277,036), and preferably, olefins with the general structure shown below:

FORMULA 1

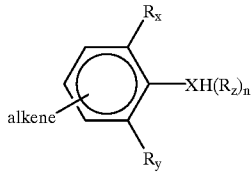

where:
'alkene' is a group which includes a polymerizable olefin and optionally includes other radicals which don't interfere undesirably with the polymerization such as alkyl radicals, aromatic radicals, silyl radicals, or additional aromatic radicals with attached $XH(R_z)_n$ groups X is a divalent or trivalent heteroatom such as oxygen, nitrogen, or sulfur;

n is 0 to 1 to satisfy the valency of the heteroatom $R_x$ and $R_y$ are independently selected from hydrogen, alkyl or aromatic radicals such as ne, E t, iPr, tBu, iBu, —$CMe_2Et$, —$CMe_2Ph$, with the proviso that $R_x$ and $R_y$ are not both hydrogen $R_z$ is selected from the groups included for $R_x$ and $R_y$ as well as silyl groups such as —$SiMe_3$, $SiEt_3$, —$SiMe_2LBU$ The term "radical" is used in this description to refer to portions of molecular structures, i.e. groups, rather than free radicals.

In the functionalized comonomers, preferably of Formula 1, alkene and alkyl groups advantageously have at least one carbon atom in the case of alkyl groups and at least two carbons in the case of alkenes and less than the number of carbons which would result in blocking sites necessary for reaction including polymerization. Thus, the groups are optionally as large as several thousand (e.g. about 5000) carbon atoms such as groups formed by previous polymerization or oligomerization when they are in positions which do not undesirably hinder subsequent reaction. Suitable size varies with position and intended use as well as catalyst. Those skilled in the art recognize that some catalysts are much more sensitive to the size of alkene presented for polymerization than other catalysts and can select group size without undue experimentation. In the simplest molecules, the alkene and alkyl groups are preferably less than about 100, more preferably less than about 20 and most preferably less than about 10 carbon atoms in size. While alkyl groups have at least one carbon atom, those represented by $R_x$ and $R_y$ preferably have sufficient atoms to render an XH group sterically hindered, thus preferably at least two, more preferably at least three and most preferably at least 4 carbon atoms with isopropyl, isobutyl and tertiary butyl groups most preferred. Alkene groups have at least 2 carbon atoms, preferably at least three, with preferred species including ally, vinyl, butenyl, propenyl, and norbornenyl. Similarly, aromatic groups, which preferably have at least about 6 carbon atoms to form a phenyl ring, are also optionally very large, about 5000 and larger when this does not interfere with subsequent reaction, especially when the aromatic group includes alkyl functionality, e.g. aralkyl and alkaryl groups. In simple molecules, the aromatic groups preferably have less than about 100, more preferably less than about 20 and most preferably less than ab out 14 carbon atoms.

Specific examples of such structures are N-silyl-4-allyl-2,6-dimethylaniline, N-trimethylsilyl-4-allyl-2,6-dimethylaniline (from silylation of the aniline prepared by the method described by Elliott and Janes, J. Chem. Soc. C, 1967, (18), 1780–2), 4-allyl-2,6-di-t-butylphenol (prepared as described by Rosenberger in French Patent 2,493,309 (1981) and by Starner and Patton in U.S. Pat. No. 3,635,886 (1972) wherein allyl halides are reacted with hindered phenols in the presence of a base. Also preferred are 4-vinyl-2,6-di-t-butylphenol (Adams and Braun in Polymer Letters 1976, (14), 463–465), 4-butenyl-2,6-di-t-butylphenol (Patton and Horeczy in U.S. Pat. No. 3,477,991 (1969), and the condensation products of olefinic aldehydes with 2,6-di-t-butylphenol (as described by Olivier in U.S. Pat. No. 5,157,164 (1992)). For example, the condensation of 2 equivalents of 5-norbornene-2-carboxaldehyde with 2,6-di-t-butylphenol yields 5-norbornene-2-bis-(3,5-di-t-butyl-4-hydroxyphenyl)methane.

The functionalized comonomer is used in any quantity effective to accomplish the desired purpose of rendering the polymer more adhesive, or improving compatibility with other polymers especially thermoplastics, preferably in an amount of at least about 0.1 weight percent, more preferably at least about 0.5 weight percent, most preferably at least about 1.0 weight percent. For applications in which the functionalized comonomer is present to provide improved thermal stability (functioning as an antioxidant), substantially less is typically required; ranges from about 10 ppm to about 5,000 ppm (0.5 weight percent) are advantageous, with a preferred range from about 100 ppm to about 2,000 ppm.

In cases where the copolymer is prepared from aromatic-XH compounds with ortho-alkyl substituents, it is possible to cleave a portion of the alkyl groups. The composition which is obtained is a copolymer of an alpha olefin and the alkene described below.

FORMULA 2

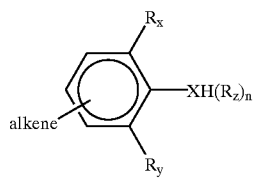

where all substituents are as in Formula 1 except that at least a portion of $R_x$ and $R_y$ are hydrogen and in some molecules both $R_x$ and $R_y$ are hydrogen.

This composition is prepared by heating the copolymer with a catalyst which cleaves the alkyl groups ortho to the heteroatom, forming an olefin and the above composition. For the purposes of illustration, a specific example of this dealkylation process is shown below. This drawing is intended to represent the chemistry which takes place on a pendant hindered phenol group attached to the polyolefin backbone.

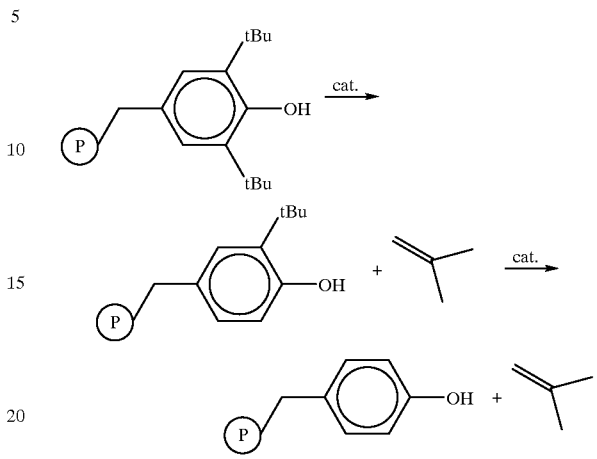

wherein P in circle represents a polymer backbones.

Suitable catalysts for this dealkylation process include organic acids such as sulfonic acids (e.g. methane sulfonic acid, benzene sulfonic acid, p-toluene sulfonic acid, trifluoromethane sulfonic acid), bis (p-tolylsulfonyl)amine, oleic acid, mineral acids such as hydrochloric acid, phosphoric acid, sulfuric acid, sodium hydrogensulfate. Solid acids, such as phosphomolybdic acid, silicomolybdic acid, acidic aluminas and silica gels. Alternately, aluminum and titanium alkoxides such as $Al(OiBu)_3$, $Al(OPh)_3$, $Ti(OEt)_4$, $Ti(OPh)_4$ are used (where ibu=isobutyl, Ph-phenyl and Et-ethyl). Preferred catalysts are soluble organic acids such as p-toluene sulfonic acid and bis(p-tolylsulfonyl)amine.

The dealkylation process can be conducted in the melt or in a solvent such as chlorobenzene, phenol, cresols, toluene, mesitylene, naphthalene, diphenyl oxide, biphenyl, high boiling alkanes such as eicosane, Isopar™ (a hydrocarbon mixture commercially available from Exxon), and other hydrocarbons. Dealkylation temperatures can range from 100° C. to 400° C., with the preferred range from about 200 to 300° C. The coproduct of this dealkylation is an olefin, which can be removed by distillation, evaporation, or other devolatilization techniques. It is also possible to use of various means to improve the removal of this coproduct, including injection of an unreactive gas such as nitrogen or argon. In the preferred embodiment, solventless process mixing equipment capable of handling high melt viscosities is used, this equipment is within the skill in the art and includes equipment such as vented extruders, kneaders, and blenders.

The dealkylation can be conducted to remove various proportions of the two ortho-groups. Suitable ranges depend on the application, but preferably at least 50 percent of the alkyl groups are advantageously removed.

Practice of the invention is applicable using any transition metal metallocene catalyst within the skill in the art. Specific metallocene catalysts known in the art are discussed in such references as EPA Nos. 485,820; 485,821; 485,822; 485,823; 518,092; and 519,237; U.S. Pat. Nos. 5,145,819; 5,296,434, all hereby incorporated herein by reference in their entireties.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Advantageous catalysts for use herein are advantageously derivatives of any transition metal including Lanthanides, but preferably of Group 3, 4, or Lanthanide metals which are in the +2, +3, or +4 formal oxidation state. Preferred compounds include metal complexes containing from 1 to 3 π-bonded anionic or neutral ligand groups, which are optionally cyclic or non-cyclic delocalized π-bonded anionic ligand groups. Exemplary of such π-bonded anionic ligand groups are conjugated or nonconjugated, cyclic or non-cyclic dienyl groups, and allyl groups. By the term "π-bonded" is meant that the ligand group is bonded to the transition metal by means of its delocalized π-electrons.

Each atom in the delocalized π-bonded group is optionally independently substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such adjacent radicals may together form a fused ring system, a hydrogenated fused ring system, or a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of advantageous hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or monovalent derivatives thereof, e. g. amide, phosphide, ether or thioether groups bonded to the transition metal or Lanthanide metal, and bonded to the hydrocarbyl group or to the hydrocarbyl- substituted metalloid containing group.

Examples of advantageous anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyle hexahydroanthracenyl, and decahydroanthracenyl groups, as well as $C_{1-10}$ hydrocarbyl-substituted or $C_{1-10}$ hydrocarbyl-substituted silyl substituted derivatives thereof. Preferred anionic delocalized n-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

A preferred class of catalysts are transition metal complexes corresponding to the Formula A:

$L_lMX_mX'_nX''_p$, or a dimer thereof wherein:

L is an anionic, delocalized, π-bonded group that is bound to M, containing up to 50 non-hydrogen atoms, optionally two L groups may be joined together forming a bridged structure, and further optionally one L is bound to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' at each occurrence is an optional neutral Lewis base having up to 20 non-hydrogen atoms and optionally one X' and one L may be joined together;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene that is 7!-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is n-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the formula:

(AI)

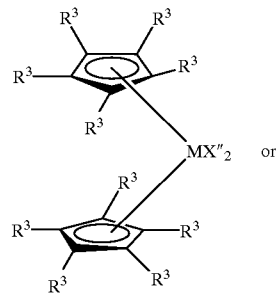

(AII)

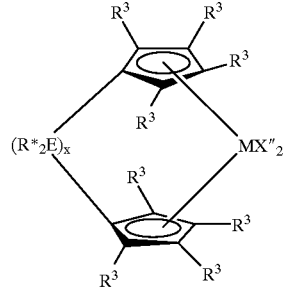

wherein:

M is titanium, zirconium or hafnium, preferably zirconium of hafnium, in the +2, 3, or +4 formal oxidation state;

R³ in each occurrence independently is selected from the group consisting of hydrogen, hydrocarbyl, silyl, germyl, cyano, halo and combinations thereof, said R³ having up to 20 non-hydrogen atoms, or adjacent R³ groups together form a divalent derivative (e.g., a hydrocarbadiyl, germadryl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a-complex with M, whereupon p is in the +2 formal oxidation state, and R*, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255–6256 (1980). Examples of chiral structures include rac bis-indenyl complexes. Similar systems based on Ti(IV) or Zr(IV) were disclosed for preparation of isotactic olefin polymers in Wild et al., J. Organomet.

Chem., 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups, including those optionally formed from two X" groups together.

A further class of metal complexes utilized in the present invention corresponds to the preceding formula $L_lMX_mX'_nX"_p$, or a dimer thereof, wherein X is a divalent substituent of up to 50 non-hydrogen atoms that together with L forms a metallocycle with M.

Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

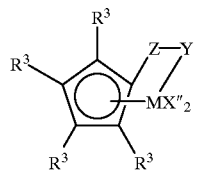

(AIII)

wherein:

M is titanium, zirconium or hafnium in the +2, +3 or +4 formal oxidation state;

X" and R³ are as previously defined for formulas AI and AII;

Y is —O—, —S—, —NR*—, —NR*₂—, or —PR*—; and

Z is SiR*₂, CR*₂, SiR*₂SiR*₂, CR*₂CR*₂, CR*=CR*, CR*₂SiR*₂, or GeR*₂, wherein R* is as previously defined.

Illustrative Group 4 metal complexes that may be employed in the practice of the present invention include: cyclopentadienyltitaniumtrimethyl, cyclopentadienyltitaniumtriethyl, cyclopentadienyltitaniumtriisopropyl, cyclopentadienyltitaniumtriphenyl, cyclopentadienyltitaniumtribenzyl, cyclopentadienyltitanium-2,4-dimethylpentadienyl, cyclopentadienyltitanium-2,4-dimethylpentadienyltriethylphosphine, cyclopentadienyltitanium-2,4-dimethylpentadienyltrimethylphosphine, cyclopentadienyltitaniumdimethylmethoxide, cyclopentadienyltitaniumdimethylchloride, pentamethylcyclopentadienyltitaniumtrimethyl, indenyltitaniumtrimethyl, indenyltitaniumtriethyl, indenyltitaniumtripropyl, indenyltitaniumtriphenyl, tetrahydroindenyltitaniumtribenzyl, pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, bis(η⁵-2,4-dimethylpentadienyl)titanium, bis(η⁵-2,4-dimethylpentadienyl)titaniumtrimethylphosphine, bis(η⁵-2,4-dimethylpentadienyl)titaniumtriethylphosphine, octahydrofluorenyltitaniumtrimethyl, tetrahydroindenyltitaniumtrimethyl, tetrahydrofluorenyltitaniumtrimethyl, (tert-butylamido)(1,1-dimethyl-2,3,4,9,10—1,4,η⁵,6,7,8-hexahydronaphthalenyl) dimethylsilanetitaniumdimethyl, (tert-butylamido)(1,1,2,3-tetramethyl-2,3,4,9,10— 1,4,5,6,7,8-hexahydronaphthalenyl)dimethylsilanetitaniumdimethyl, (tert-butylamido)(tetramethyl-η⁵-cyclopentadienyl) dimethylsilanetitanium dibenzyl, (tert-butylamido)(tetramethyl-η⁵-cyclopentadienyl)dimethylsilanetitanium dimethyl, (tert-butylamido) (tetramethyl-η⁵-cyclopentadienyl)-1,2-ethanediyltitanium dimethyl, (tert-butylamido) (tetramethyl-η⁵-indenyl)dimethylsilanetitanium dimethyl, (tert-butylamido)(tetramethyl-η⁵-cyclopentadienyl) dimethylsilane titanium (III) 2-(dimethylamino)benzyl; (tert-butylamido)(tetramethyl-η⁵-cyclopentadienyl) dimethylsilanetitanium (III) allyl, (tert-butylamido) (tetramethyl-η⁵-cyclopentadienyl)dimethylsilanetitanium (III) 2,4-dimethylpentadienyl, (tert-butylamido)(tetramethyl-$\eta^5$-cyclopentadienyl)dimethyl-silanetitanium (II) 1,4-diphenyl-1,3-butadiene, (tert-butylamido)(tetramethyl-$\eta^5$-cyclopentadienyl)dimethyl-silanetitanium (II) 1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium (II) 2,4-hexadiene, (tert-butylamido)(2-methylindenyl)dimethylsilanetitanium (IV) 2,3-dimethyl-1,3-butadiene, (tert-butylamido)(2-methylindenyl)dimethylsilanetitanium (IV) isoprene, (tert-butylamido)(2-methylindenyl)dimethylsilanetitanium 1,3-butadiene, (tert-butylamido)(2,3-dimethylindenyl)dimethylsilanetitanium (IV) 2,3-dimethyl-1,3-butadiene, (tert-butylamido)(2,3-dimethylindenyl)dimethylsilanetitanium (IV) isoprene; (tert-butylamido)(2,3-dimethylindenyl)dimethylsilanetitanium (IV) dimethyl; (tert-butylamido)(2,3-dimethylindenyl)dimethylsilanetitanium (IV) dibenzyl; (tert-butylamido)(2,3-dimethylindenyl)dimethylsilanetitanium 1,3-butadiene,(tert-butylamido)(2,3-dimethylindenyl)dimethylsilanetitanium (II) 1,3-pentadiene, (tert-butylamido)(2,3-dimethylindenyl)dimethylsilanetitanium (II) 1,4-diphenyl-1,3-butadiene, (tert-butylamido)(2-methylindenyl)dimethylsilanetitanium (II) 1,3-pentadiene,(tert-butylamido)(2-methylindenyl)dimethylsilanetitanium (IV) dimethyl, (tert-butylamido)(2-methylindenyl)dimethylsilanetitanium (IV) dibenzyl, (tert-butylamido)(2-methyl-4-phenylindenyl)dimethylsilanetitanium (II) 1,4-diphenyl-1,3-butadiene, (tert-butylamido)(2-methyl-4-phenylindenyl)dimethylsilanetitanium (II) 1,3-pentadiene, (tert-butylamido)(2-methyl-4-phenylindenyl)dimethylsilanetitanium (II) 2,4-hexadiene, (tert-butylamido)(tetramethyl-$\eta^5$-cyclopentadienyl)dimethyl-silanetitanium 1,3-butadiene, (tert-butylamido)(tetramethyl-$\eta^5$-cyclopentadienyl)dimethyl-silanetitanium (IV) 2,3-dimethyl-1,3-butadiene, (tert-butylamido)(tetramethyl-$\eta^5$-cyclopentadienyl)dimethyl-silanetitanium (IV) isoprene, (tert-butylamido)(tetramethyl-$\eta^5$-cyclopentadienyl)dimethyl-silanetitanium (II) 1,4-dibenzyl-1,3-butadiene, (tert-butylamido)(tetramethyl-$\eta^5$-cyclopentadienyl)dimethyl-silanetitanium (II) 2,4-hexadiene, (tert-butylamido)(tetramethyl-$\eta^5$-cyclopentadienyl)dimethyl-silanetitanium (II) 3-methyl-1,3-pentadiene, (tert-butylamido)(2,4-dimethylpentadien-3-yl)dimethyl-silanetitaniumdimethyl, (tert-butylamido)(6,6-dimethylcyclohexadienyl)dimethyl-silanetitaniumdimethyl, (tert-butylamido)(1,1-dimethyl-2,3,4,9,10—1,4,5,6,7,8-hexahydronaphthalen-4-yl)dimethylsilanetitaniumdimethyl, (tert-butylamido)(1,1,2,3-tetramethyl-2,3,4,9,10— 1,4,5,6,7,8-hexahydronaphthalen-4-yl)dimethylsilanetitaniumdimethyl(tert-butylamido)(tetramethyl-$\eta^5$-cyclopentadienyl methylphenyl-silanetitanium (IV) dimethyl, (tert-butylamido)(tetramethyl-$\eta^5$-cyclopentadienyl methylphenyl-silanetitanium (II) 1,4-diphenyl-1,3-butadiene, 1-(tert-butylamido)-2-(tetramethyl-$\eta^5$-cyclopentadienyl)ethanediyl-titanium (IV) dimethyl, and 1-(tert-butylamido)-2-(tetramethyl-$\eta^5$-cyclopentadienyl) ethanediyl-titanium (II) 1,4-diphenyl-1,3-butadiene.

Complexes containing two L groups including bridged complexes suitable for use in the present invention include: bis(cyclopentadienyl)zirconiumdimethyl, bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl, bis(cyclopentadienyl) zirconiummethylmethoxide, bis(cyclopentadienyl)zirconiummethylchloride, bis(pentamethylcyclopentadienyl)zirconiumdimethyl, bis(pentamethylcyclopentadienyl)titaniumdimethyl, bis(indenyl)zirconiumdimethyl, indenylfluorenylzirconiumdimethyl, bis(indenyl)zirconiummethyl(2-(dimethylamino)benzyl), bis(indenyl)zirconium methyltrimethylsilyl, bis(tetrahydroindenyl)zirconium methyltrimethylsilyl, bis(pentamethylcyclopentadienyl)zirconiummethylbenzyl, bis(pentamethylcyclopentadienyl)zirconiumdibenzyl, bis(pentamethylcyclopentadienyl)zirconiummethylmethoxide, bis(pentamethylcyclopentadienyl)zirconiummethylchloride, bis(methylethylcyclopentadienyl)zirconiumdimethyl, bis(butylcyclopentadienyl)zirconium dibenzyl, bis(t-butylcyclopentadienyl)zirconiumdimethyl, bis(ethyltetramethylcyclopentadienyl)zirconiumdimethyl, bis(methylpropylcyclopentadienyl)zirconium dibenzyl, bis(trimethylsilylcyclopentadienyl)zirconium dibenzyl, dimethylsilyl-bis(cyclopentadienyl)zirconiumdimethyl, dimethylsilyl-bis(tetramethylcyclopentadienyl)titanium(III) allyl dimethylsilyl-bis(t-butylcyclopentadienyl) zirconiumdichloride, dimethylsilyl-bis(n-butylcyclopentadienyl)zirconiumdichloride, (methylene-bis(tetramethylcyclopentadienyl)titanium(III) 2-(dimethylamino)benzyl, (methylene-bis(n-butylcyclopentadienyl)titanium(III) 2-(dimethylamino) benzyl, dimethylsilyl-bis(indenyl)zirconiumbenzylchloride, dimethylsilyl-bis(2-methylindenyl)zirconiumdimethyl, dimethylsilyl-bis(2-methyl-4-phenylindenyl) zirconiumdimethyl, dimethylsilyl-bis(2-methylindenyl) zirconium-1,4-diphenyl-1,3-butadiene, dimethylsilyl-bis(2-methyl-4-phenylindenyl)zirconium (II) 1,4- diphenyl-1,3-butadiene, dimethylsilyl-bis(tetrahydroindenyl)zirconium (II) 1,4-diphenyl-1,3-butadiene, dimethylsilyl-bis(fluorenyl) zirconiummethylchloride, dimethylsilyl-bis(tetrahydrofluorenyl)zirconium bis(trimethylsilyl), (isopropylidene)(cyclopentadienyl)(fluorenyl) zirconiumdibenzyl, and dimethylsilyl (tetramethylcyclopentadienyl)(fluorenyl)zirconium dimethyl.

Other catalysts, especially catalysts containing other Group 4 metals, will, of course, be apparent to those skilled in the art.

Preferred metallocene species for use in the practice of the present invention include constrained geometry metal complexes, including titanium complexes; methods for their preparation are disclosed in U.S. application Ser. No. 545,403, filed Jul. 3, 1990 (EP-A-416,815); U.S. application Ser. No. 967,365, filed Oct. 28, 1992 (EP-A-514,828); and U.S. application Ser. No. 876,268, filed May 1, 1992, (EP-A-520, 732), as well as U.S. Pat. No. 5,055,438, U.S. Pat. No. 5,057,475, U.S. Pat. No. 5,096,867, U.S. Pat. No. 5,064,802, U.S. Pat. No. 5,096,867, U.S. Pat. No. 5,132,380, U.S. Pat. No. 5,132,380, U.S. Pat. No. 5,470,993, U.S. Pat. No. 5,486,632 and U.S. Pat. No. 5,132,380, U.S. Pat. No. 5,321,106. The teachings of all the foregoing patents, publications and patent applications is hereby incorporated by reference in their entireties.

Metallocene catalysts are advantageously rendered catalytically active by combination with one or more activating cocatalysts, by use of an activating technique, or a combination thereof. In the practice of the present invention, advantageous cocatalysts are those boron-containing cocatalysts within the skill in the art. Among the boron-containing cocatalysts are tri(hydrocarbyl)boron compounds and halogenated derivatives thereof, advantageously having from 1 to about 10 carbons in each hydrocarbyl or halogenated hydrocarbyl group, more especially perfluorinated tri(aryl) boron compounds, and most especially tris (pentafluorophenyl)borane); amine, phosphine, aliphatic alcohol and mercaptan adducts of halogenated tri($C_{1-10}$hydrocarbyl)boron compounds, especially such adducts of perfluorinated tri(aryl)boron compounds; non polymeric, ionic, compatible, non-coordinating, activating compounds (including use of such compounds under oxidizing conditions. Alternatively, the cocatalyst includes borates such as tetraphenyl borate having as counterions ammonium ions such as are within the skill in the art as illustrated by European Patent EP 672,688 (Canich, Exxon), published Sep. 20, 1995.

Illustrative, but not limiting examples of boron compounds which may be used as an activating cocatalyst in the preparation of the improved catalysts of this invention are trihydrocarbyl-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl) ammonium tetraphenylborate, N,N-dimethylanilinium tetraphenylborate, N,N-diethylanilinium tetraphenylborate, N,N-dimethyl-(2,4,6trimethylanilinium) tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri (sec-butyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium) tetrakis(pentafluorophenyl) borate, trimethylammonium tetrakis—(2,3,4, 6-tetrafluorophenylborate, triethylammonium tetrakis-(2,3, 4,6-tetrafluorophenyl) borate, tripropylammonium tetrakis-(2,3,4,6-tetrafluorophenyl) borate, tri(n-butyl)ammonium tetrakis-(2,3,4,6-tetrafluorophenyl) borate, dimethyl(t-butyl) ammonium tetrakis—(2,3,4,6-tetrafluorophenyl) borate, N,N-dimethylanilinium tetrakis-(2,3,4,6-tetrafluorophenyl) borate, N,N-diethylanilinium tetrakis-(2,3,4,6-tetrafluorophenyl) borate, and N,N-dimethyl-(2,4,6-trimethylanilinium) tetrakis-(2,3,4,6-tetrafluorophenyl) borate; dihydrocarbyl ammonium salts such as:
di-(i-propyl)ammonium tetrakis(pentafluorophenyl) borate, and dicyclohexylammonium tetrakis(pentafluorophenyl) borate; and
trihydrocarbyl-substituted phosphonium salts such as: triphenylphosphonium tetrakis(pentafluorophenyl) borate, tri(o-tolyl)phosphonium tetrakis(pentafluorophenyl) borate, and tri(2,6-dimethylphenyl)phosphonium tetrakis (pentafluorophenyl) borate.

Other boron cocatalysts include diphenyldi (hydroxyphenyl)borate, diphenyldi(2,4-dihydroxyphenyl) borate, di(p-tolyl) di(hydroxyphenyl)borate, di(pentafluorophenyl)di-(hydroxyphenyl)borate, di(2,4-dimethylphenyl) di(hydroxyphenyl)borate, di (3,5-dimethylphenyl) di(hydroxyphenyl)borate, di (3,5-ditrifluoromethylphenyl) di(hydroxyphenyl)borate, di(pentafluorophenyl) di(2-hydroxyethyl)borate, di(pentafluorophenyl) di(4-hydroxybutyl)borate, di(pentafluorophenyl) di(4-hydroxycyclohexyl)borate, di(pentafluorophenyl) di(4-(4'-hydroxyphenyl)phenyl) borate, di(pentafluorophenyl) di(6-hydroxy-2-naphthyl) borate, tris(pentafluorophenyl)(4 -hydroxyphenyl)borate and the like with a Bronstead acidic cation preferably ammonium, phosphonium or sulfonium cation, especially tri-substituted ammonium salts such as: decyldi(methyl) ammonium, dodecyldi(methyl)ammonium, tetradecyldi (methyl)ammonium, hexaadecyldi(methyl)ammonium, octadecyldi(methyl)ammonium, eicosyldi(methyl) ammonium, methyldi(decyl)ammonium, methyldi(dodecyl) ammonium, methyldi(tetradecyl)ammonium, methyldi (hexadecyl)ammonium, methyldi(octadecyl)ammonium, methyldi(eicosyl)ammonium, tridecylammonium, tridodecylammonium, tritetradecylammonium, trihexadecylammonium, trioctadecylammonium, trieicosylammonium, decyldi(n-butyl)ammonium, dodecyldi(n-butyl)ammonium, octadecyldi(n-butyl) ammonium, N,N-didodecylanilinium, N-methyl-N-dodecylanilinium, N,N-di(octadecyl)(2,4,6-trimethylanilinium), cyclohexyldi(dodecyl)ammonium, and methyldi(dodecyl)ammonium or a similarly substituted sulfonium or phosphonium cation such as, di(decyl)sulfonium, (n-butyl)dodecylsulfonium, tridecylphosphonium, di(octadecyl)methylphosphonium, or tri(tetradecyl) phosphonium, most preferably di(octadecyl) methylammonium tris(pentafluorophenyl) (hydroxyphenyl) borate, octadecyl dimethylammonium tris (pentafluorophenyl)borate and di(octadecyl) (n-butyl) ammonium tris(pentafluorophenyl)(hydroxyphenyl)-borate, and the amino (—NHR) analogues of these compounds wherein the hydroxyphenyl group is replaced by the aminophenyl group.

Alternatively, the boron compound is a boratabenzene. The boratabenzenes are anionic species which are boron containing analogues to benzene. They are described by G. Herberich, et al., in organometallics, 14,1, 471–480 (1995). Synthesis of hydroboratabenzene and boratabenzene salts are within the skill in the art such as illustrated by Ashe, et al. *J. Amer. Chem. Soc.,* 1971, 93, 1804–1805; Hoic, et al., *J. Amer. Chem. Soc.,* 1995, 117, 8480–8481; Herberich, G. E. in *Comprehensive Organo-Metallic Chemistry,* Wilkinson, Stone and Abel, Pergamon, New York, Vol. 1, pages 392–409, 1982 and Herberich, et al., *Organometallics,* 1995, 14, 471–480.

The boratabenzenes are preferably 1,4-Dihydroboratabenzenes (hereinafter also referred to as hydroboratabenzenes or collectively with boratabenzene anions as boratabenzene cocatalysts) are compounds of Formula 3:

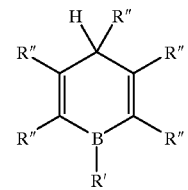

wherein R' is a hydrocarbyl group, silylhydrocarbyl, perfluorohydrocarbyl group, dialkylamido group or halide (Cl, Br, I or F, preferably Cl, Br or F more preferably F). The hydrocarbyl group, is linear, branched, cyclic, aromatic, alkyl aromatic, or arylalkyl and is unsubstituted or inertly substituted and preferably has less than 24 carbon atoms, more preferably from 1 to 24, most preferably from 1 to 12 carbon atoms, particularly preferably 6 carbon atoms, especially an unsubstituted or inertly substituted phenyl ring. Inertly substituted means having substituents which do not undesirably interfere with the function of the cocatalyst in activation of the metallocene catalyst or the catalytic activity of the resulting activated catalyst. Such inert substitutents include halogen atoms (Cl, Br, I, or F, more preferably Cl, Br, F, most preferably F), nitrogen-containing groups not having active hydrogen such as tertiary amine or amide groups, silyl groups, ether oxygen, and hydrocarbyl, perhalohydrocarbyl preferably pentafluorophenyl. Preferred hydrocarbyl groups include unsubstituted and fluoro substituted hydrocarbyl groups which are electron withdrawing in nature. The alkyl groups on dialkylamido groups are the same or different from one another and are independently unsubstituted or inertly substituted as the hydrocarbyl groups and preferably each have from 1 to 24, preferably from 1 to 12, most preferably from 1 to 6 carbon atoms. Each R' independently optionally is or comprises D, a linking group described hereinafter.

Each R" is independently H, or an unsubstituted or inertly substituted hydrocarbyl, silylhydrocarbyl, perfluorocarbyl, alkoxide or dihydrocarbyl amido group. Each carbon-containing group is as described for R' and preferably has from 1 to 12 carbon atoms (for a total of preferably less than 24 carbon atoms for the dialkylamido group). Two or more R" or R' and at least one R" are optionally joined into a ring or rings which are suitably aromatic, alkyl, or heteroatom containing rings or combinations thereof. Preferably all R" are H for ease of synthesis. For delocalizing the negative charge, each R" is preferably selected from fluorine, fluorohydrocarbyl, fluorocarbyl, chlorine, more preferably fluorine or fluorine-containing groups. Bulky hydrocarbyl groups, such as tertiary butyl, are also desirable R" groups as these groups often help render the boratabenzene anion non-coordinating. Each R" independently optionally is or comprises D, a linking group described hereinafter.

Advantageously, R' and R" are preferably selected to delocalize negative charge and thus stabilize the corresponding anion. Any R" which is not hydrogen is preferably ortho or para, more preferably para to the boron atom of the boratabenzene ring.

Compounds of Formula 3 are known to form anions of Formula 4 readily because of the acidity of the hydrogen atom. Acidity is increased by substitution which increases the ability of the boratabenzene ring to delocalize negative charge. Formula 4:

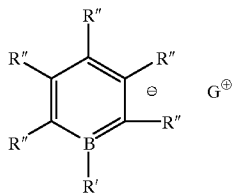

wherein R' and R" are as defined for Formula 3. The boratabenzene anion of Formula 4 is associated with a cation $G^+$, for instance the cation of an ionic activator, preferably $[NHR_3]^+$, $[NR_4]^+$, $[SiR_3]^+$, $[CPh_3]^+$, or $[(C_5H_5)_2Fe]^+$ or $Ag^+$, where R is independently in each occurrence a hydrocarbyl, silylhydrocarbyl, or perfluorocarbyl of from 1 to 24 carbons, more preferably from 1 to 12 carbons arranged in a linear, branched, or ring structure. Ph is phenyl. In a preferred embodiment $[NHR_3]^+$ is $[NH(CH_3)(C_{18}H_{37})_2]^+$.

Alternatively $G^+$ is a cation arising from the reaction of a metallocene with a 1,4-dihydroboratabenzene of Formula 3. In this embodiment $G^+$ may be either the metallocene cation or a cationic species arising from a subsequent reaction.

Illustrative, but non-limiting, examples of 1,4-dihydroboratabenzene cocatalysts of Formula 3 are 1-phenyl-1,4-dihydroboratabenzene; 1-methyl-1,4-dihydroboratabenzene; 1-ethyl-1,4-dihydroboratabenzene; 1-pentafluorophenyl-1,4-dihydroboratabenzene; 1-dimethylamido-1,4-dihydroboratabenzene; 1-neopentyl-1,4-dihydroboratabenzene; 1-'butyl-1,4-dihydroboratabenzene; 1-trimethylsilyl-1,4-dihydroboratabenzene; 1-trimethylsilylmethyl-1,4-dihydroboratabenzene; 1-fluoro-1,4-dihydroboratabenzene; 1-(3,5-bis-trifluoromethyl-phenyl)-1,4-dihydroboratabenzene; 1-phenyl-4-methyl-1,4-dihydroboratabenzene; 1-methyl-4-methyl-1,4-dihydroboratabenzene; 1-ethyl-4-methyl-1,4-dihydroboratabenzene; 1-pentafluorophenyl-4-methyl-1,4-dihydroboratabenzene; 1-dimethylamido-4-methyl-1,4-dihydroboratabenzene; 1-neopentyl-4-methyl-1,4-dihydroboratabenzene; 1-'butyl-4-methyl-,4-dihydroboratabenzene; 1-trimethylsilyl-4-methyl-1,4-dihydroboratabenzene; 1-trimethylsilylmethyl-4-methyl-1,4-dihydroboratabenzene; 1-fluoro-4-methyl-1,4-dihydroboratabenzene; 1-(3,5-bis-trifluoromethyl-phenyl)-4-methyl-1,4-dihydroboratabenzene; 1-phenyl-4-'butyl-1,4-dihydroboratabenzene; 1-methyl-4-'butyl-1,4-dihydroboratabenzene; 1-ethyl-4-'butyl-1,4-dihydroboratabenzene; 1-pentafluorophenyl-4-'butyl-1,4-dihydroboratabenzene; 1-dimethylamido-4-'butyl-1,4-dihydroboratabenzene; 1-neopentyl-4-'butyl-1,4-dihydroboratabenzene; 1-'butyl-4-'butyl-1,4-dihydroboratabenzene; 1-trimethylsilyl-4-'butyl-1,4-dihydroboratabenzene; 1-trimethylsilylmethyl-4-'butyl-1,4-dihydroboratabenzene; 1-fluoro-4-'butyl-1,4-dihydroboratabenzene; 1-(3,5-bis-trifluoromethyl-phenyl)-4-'butyl-1,4-dihydroboratabenzene; 1-phenyl-2,4-dimethyl-1,4-dihydroboratabenzene; 1,2,4-trimethyl-1,4-dihydroboratabenzene; 1-ethyl-2,4-dimethyl-1,4-dihydroboratabenzene; 1-pentafluorophenyl-2,4-dimethyl-1,4-dihydroboratabenzene; 1-dimethylamido-2,4-dimethyl-1,4-dihydroboratabenzene; 1-neopentyl-2,4-dimethyl-1,4-dihydroboratabenzene; 1-'butyl-2,4-dimethyl-1,4-dihydroboratabenzene; 1-trimethylsilyl-2,4-dimethyl-1,4-dihydroboratabenzene; 1-trimethylsilylmethyl-2,4-dimethyl-1,4-dihydroboratabenzene; 1-fluoro-2,4-dimethyl-1,4-dihydroboratabenzene; 1-(3,5-bis-trifluoromethyl-phenyl)-2,4-dimethyl-1,4-dihydroboratabenzene; 1-phenyl-2-methoxide-4-'butyl-1,4-dihydroboratabenzene; 1-methyl-2-methoxide-4-'butyl-1,4-dihydroboratabenzene; 1-ethyl-2-methoxide-4-'butyl-1,4-dihydroboratabenzene; 1-pentafluorophenyl-2-methoxide-4-'butyl-1,4-dihydroboratabenzene; 1-dimethylamido-2-methoxide-4-'butyl-1,4-dihydroboratabenzene; 1-neopentyl-2-methoxide-4-'butyl-1,4-dihydroboratabenzene; 1-'butyl-2-methoxide 4-'butyl-1,4-dihydroboratabenzene; 1-trimethylsilyl-2-methoxide-4-'butyl-1,4-dihydroboratabenzene; 1-trimethylsilylmethyl-2-methoxide-4-'butyl-1,4-dihydroboratabenzene; 1-fluoro-2-methoxide-4-'butyl-1,4-dihydroboratabenzene; 1-(3,5-bis-trifluoromethyl-phenyl)-2-methoxide-4-'butyl-1,4-dihydroboratabenzene; 1-phenyl-4-'butyl-6-trimethylsilyl-1,4-dihydroboratabenzene; 1-methyl-4-'butyl-6-trimethylsilyl-1,4-dihydroboratabenzene; 1-ethyl-4-'butyl-6-trimethylsilyl-1,4-dihydroboratabenzene; 1-pentafluorophenyl-4-'butyl-6-trimethylsilyl-1,4-dihydroboratabenzene; 1-dimethylamido- 4-'butyl-6-trimethylsilyl-1,4-dihydroboratabenzene; 1-neopentyl-4-'butyl-6-trimethylsilyl-1,4-dihydroboratabenzene; 1-'butyl-4-'butyl-6-trimethylsilyl-1,4-dihydroboratabenzene; 1-trimethylsilyl-4-'butyl-6-trimethylsilyl-1,4-dihydroboratabenzene; 1-trimethylsilylmethyl-4-'butyl-6-trimethylsilyl-1,4-dihydroboratabenzene; 1-fluoro-4-'butyl-6-trimethylsilyl-1,4-dihydroboratabenzene; 1-(3,5-bis-trifluoromethyl-phenyl)-4-'butyl-6-trimethylsilyl-1,4- dihydroboratabenzene; 1-phenyl-2-diethylamido-4-$^t$butyl-1, 4-dihydroboratabenzene; 1-methyl-2-diethylamido-4-$^t$butyl-1,4-dihydroboratabenzene; 1-ethyl-2diethylamido-4-$^t$butyl-1,4-dihydroboratabenzene; 1-pentafluorophenyl-2-diethylamido-4-$^t$butyl-1,4-dihydroboratabenzene; 1-dimethylamido-2-diethylamido-4-$^t$butyl-1,4-dihydroboratabenzene; 1-neopentyl-2-diethylamido-4-$^t$butyl-1,4-dihydroboratabenzene; 1-$^t$butyl-2-diethylamido-4-$^t$butyl-1,4-dihydroboratabenzene; 1-trimethylsilyl-2-diethylamido-4-$^t$butyl-1,4-dihydroboratabenzene; 1-trimethylsilylmethyl-2-diethylamido-4-$^t$butyl-1,4-dihydroboratabenzene; 1-fluoro-2-diethylamido-4-$^t$butyl-1, 4-dihydroboratabenzene; 1-(3,5-bis-trifluoromethyl-phenyl)-2-diethylamido-4-$^t$butyl-1,4-dihydroboratabenzene; 1-phenyl-4-pentafluorophenyl-1,4-dihydroboratabenzene; 1-methyl-4-pentafluorophenyl-1,4-dihydroboratabenzene; 1-ethyl-4-pentafluorophenyl-1,4-dihydroboratabenzene; 1,4-bispentafluorophenyl-1,4-dihydroboratabenzene; 1-dimethylamido-4-pentafluorophenyl-1,4-dihydroboratabenzene; 1-neopentyl-4-pentafluorophenyl-1,4-dihydroboratabenzene; 1-$^t$butyl-4-pentafluorophenyl-1,4-dihydroboratabenzene; 1-trimethylsilyl-4-pentafluorophenyl-1,4dihydroboratabenzene; 1-trimethylsilylmethyl-4-pentafluorophenyl-1,4-dihydroboratabenzene; 1-fluoro-4-pentafluorophenyl-1,4-dihydroboratabenzene; and 1-(3,5-bis-trifluoromethyl-phenyl)-4-pentafluorophenyl-1,4-dihydroboratabenzene , and mixtures thereof.

Of these compounds, preferred species of Formula 3 and 4 are those wherein R' is aromatic, preferably phenyl, most preferably perfluorophenyl. Alternatively R' is preferably fluorohydrocarbyl preferably perfluorohydrocarbyl. Of these, the preferred species are 1-perfnluorophenyl-1,4-dihydroboratabenzene, [$C_5H_6B$—$C_6F_5$] and the corresponding anion [$C_5H_5B$—$C_6F_5$]$^-$, compounds of Formulas 3 and 4 respectively wherein R' is perfluorophenyl and all R" are H.

Use of the boratabenzenes is explained in U.S. patent application Ser. No. 08/821,506 filed Mar. 21, 1997 which is incorporated herein by reference in its entirety.

While one advantage of the process of the invention is the avoidance of aluminum compounds which protect or otherwise react with the functionalized comonomers in a 1:1mole ratio, those skilled in the art will recognize that aluminum compounds still can be advantageously used in very small quantities to remove (scavenge) water or other impurities. Thus, while compositions of the invention preferably avoid aluminum in quantities approaching a 1:1 mole ratio with the functionalized comonomer, aluminum compounds are optionally present in incidental quantities, e.g. in amounts corresponding to a mole ratio of functionalized comonomer to aluminum compound of greater than about 50:1, more preferably greater than about 100:1.

In the practice of the invention, cocatalysts are used in amounts and under conditions within the skill in the art. Their use is applicable to all processes within the skill in the art, including solution, slurry, bulk (especially for propylene), and gas phase polymerization processed. Such processes include those fully disclosed in the references cited previously.

The molar ratio of catalyst/cocatalyst or activator employed preferably ranges from about 1:10,000 to about 100:1, more preferably from about 1:5000 to about 10:1, most preferably from about 1:1000 to about 1:1.

The molar ratio of Functionalized Comonomer to catalyst is preferably at least about 100; the molar ratio of Functionalized Comonomer to cocatalyst is preferably at least about 100. More preferably the molar ratio of Functionalized Comonomer to catalyst and cocatalyst is preferably at least about 100.

When utilizing strong Lewis acid cocatalysts to polymerize higher α-olefins, especially propylene, it has been found especially desirable to also contact the catalyst/cocatalyst mixture with a small quantity of ethylene or hydrogen (preferably at least one mole of ethylene or hydrogen per mole of metal complex, suitably from 1 to 100,000 moles of ethylene or hydrogen per mole of metal complex). This contacting may occur before, after or simultaneously to contacting with the higher -olefin. If the foregoing Lewis acid activated catalyst compositions are not treated in the foregoing manner, either extremely long induction periods are encountered or no polymerization at all results. The ethylene or hydrogen may be used in a suitably small quantity such that no significant affect on polymer properties is observed. For example, polypropylene having physical properties equal to or superior to polypropylene prepared by use of other metallocene catalyst systems is prepared according to the present invention.

In most instances, the polymerization advantageously takes place at conditions known in the prior art for Ziegler-Natta or Kaminsky-Sinn type polymerization reactions, i.e., temperatures from 0–250° C. and pressures from atmospheric to 3000 atmospheres. Suspension, solution, slurry, gas phase or high pressure, whether employed in batch or continuous form or under other process conditions, including the recycling of condensed monomers or solvent, is optionally employed. Examples of such processes are well known in the art for example, WO 88/02009-A1 or U.S. Pat. No. 5,084,534, disclose conditions that are advantageously employed with the polymerization catalysts and are incorporated herein by reference in their entireties. A support, especially silica, alumina, or a polymer (especially polytetrafluoroethylene or a polyolefin) is optionally employed, and desirably is employed when the catalysts are used in a gas phase polymerization process. Such supported catalysts are advantageously not affected by the presence of liquid aliphatic or aromatic hydrocarbons such as are optionally present under the use of condensation techniques in a gas phase polymerization process. Method s for the preparation of supported catalysts are disclosed in numerous references, examples of which are U.S. Pat. Nos. 4,808,561, 4,912,075, 5,008,228, 4,914,253, and 5,086,025 and are suitable for the preparation of supported catalysts.

In such a process the reactants and catalysts are optionally added to the solvent sequentially, in any order, or alternatively one or more of the reactants or catalyst system components are premixed with solvent or material preferably miscible therewith then mixed together or into more solvent optionally containing the other reactants or catalysts. The preferred process parameters are dependant on the monomers used and the polymer desired.

Polymerization of olefins is within the skill in the art. When ethylene is used as a monomer, ethylene is advantageously added to the reaction vessel in an amount to maintain a differential pressure in excess of the combined vapor pressure of the solvent, functionalized comonomer, and optional alpha-olefin. Generally, the polymerization process is carried out with a differential pressure of ethylene of from about 10 to about 1000 psi (70 to 7000 kPa), most preferably from about 40 to about 400 psi (280 to 2800 kPa). The polymerization is then generally conducted at a temperature of from 25 to 200° C., preferably from 50 to 170° C., and most preferably from 70 to 140° C.

When propylene is a monomer, it is added to the reaction vessel in predetermined amounts to achieve predetermined per ratios, advantageously in gaseous form using a joint mass flow controller. Alternatively propylene or liquid monomers are added to the reaction vessel in amounts predetermined to result in ratios desired in the final product. They can be added together with the solvent (if any), alpha-olefin and functional comonomer, or alternatively added separately. The pressure in the reactor is a function of the temperature of the reaction mixture and the relative amounts of propylene and/or other monomers used in the reaction. Advantageously, the polymerization process is carried out at a pressure of from about 10 to about 1000 psi (70 to 7000 kPa), most preferably from about 140 to about 170 psi (980 to 1200 kPa). The polymerization is then conducted at a temperature of from 25 to 200° C., preferably from 50 to 100° C., and most preferably from 60 to 80° C.

The process is advantageously continuous, in which case the reactants are added continuously or at intervals and the catalyst and, optionally cocatalyst, are added as needed to maintain reaction and/or make up loss.

Polymers of the invention advantageously exhibit superior adhesion to metals in comparison with control polyolefins with no functional comonomer. This property is useful for coatings, wire insulation, hot-melt glues, as a primer layer for bonding metals to other substrates, for improving paint adhesion, in films for food packaging, and other uses where heat-sealability is required. For these applications the proportion of functional comonomer is from about 0.1 weight percent to about 50 weight percent, preferably from about 0.1 weight percent to about 10 weight percent, and most preferably from about 0.1 weight percent to about 2 weight percent.

Polymers of the invention advantageously exhibit removability of the hindering groups to result in reactive functional groups, preferably phenol groups. sufficient to react with carbonates, esters, isocyanates, and epoxy groups. This reactivity can be used to improve compatibility of the functional copolymer with another polymer or organic coating. The proportion of ortho-alkyl groups removed is preferably at least about 10 mole percent, more preferably at least about 20 mole percent, most preferably at least about 40 mole percent.

Advantageously, because at most incidental amounts of aluminum are used in the process of the invention, the resulting polymers of the invention have little residual aluminum, less than similar polymers produced by processes within the skill in the art. Additionally, because acid treatment is not needed to remove aluminum, there are no ill effects such as degradation and/or residual acid from such a treatment. It is also possible to actually incorporate a larger concentration of Functionalized Comonomer in the polymer than was possible in the prior art processes.

The following examples are to illustrate this invention and not limit it. Ratios, parts, and percentages are by weight unless otherwise stated. Examples (Ex) of the invention are designated numerically while comparative samples (C.S.) are designated alphabetically and are not examples of the invention. For proton NMR, 5 mm tubes with $Cl_2CDCDCl_2$ (~5 percent weight/weight) solutions were run at 130° C. probe temperature. Proton NMR was useful for determination of phenolic monomer incorporation. Peaks at 7.0 ppm (singlet for aromatic protons) and at 2.5 ppm (doublet for benzylic methylenes) were present. The latter assignment was confirmed using allylbenzene as a comonomer. Gel permeation chromatography (GPC) was performed using a crosslinked polystyrene gel chromatography column commercially available from Polymer Laboratories under the trade designation PLgel mixed-D column (10 mm inside diameter by 300 mm long) filled with 5 μm particles. A diode array detector set to 280 nm (4 nm bandwidth) was used in series with a HP 1057 refractive index detector commercially available from Hewlett Packard according to manufacturer's directions. The polymers were dissolved in chloroform (1 percent weight/volume) except where noted. The flow rate was set to 0.5 mL/min, with an injection volume of 25 μL. The column was calibrated using a broad polystyrene standard ($M_w$ 250,000, $M_n$ 100,000) with the diode array detector set to 254 nm. In all cases where a phenolic comonomer (or the silyl derivative) was used, analysis by GPC showed superimposable peaks from the refractive index and the UV detectors. This indicates that the phenolic comonomer is randomly distributed throughout the polymer chains. The data from the refractive index detector was used for molecular weight determination.

Ex. 1: Polymerization of 4-allyl-2,6-di-tert-butyl phenol (ABOH) with ethylene and octene A two-liter Autoclave reactor is charged with 707 g mixed alkanes solvent commercially (available from Exxon Chemicals Inc. under the trade designation Isopar-E™), 121 g 1-octene, and 5 mL 4-allyl-2,6-di-tert-butyl phenol comonomer. Hydrogen is added as a molecular weight control agent by differential pressure expansion from a 75 mL addition tank at 24 psi (1987 kPa). The reactor is heated to the polymerization temperature of 100° C. and saturated with ethylene at 479 psi (3.25 MPa). Catalyst ($\eta^5$—$C_5Me_4SiMe_2(N\text{-tBu})TiMe_2$) and cocatalyst —$B(C_6F_5)_3$ (4 micromole each, 0.005 M solutions in toluene) are premixed in the drybox. The solution is transferred to a catalyst addition tank and injected into the reactor. The polymerization conditions are maintained for 156 seconds with ethylene on demand (maintained constant ethylene pressure of 3.25 MPa). The resulting solution is removed from the reactor and dried in a vacuum oven with a temperature ramp and maximum temperature of 130° C. for approximately 15 hours. A portion of the tough, translucent polymer is dissolved over several hours in hot toluene (400 mL). This viscous solution is precipitated into 1 L methanol in an explosion-proof Waring blender. The fibrous white polymer is filtered, washed twice with 200 mL methanol, air-dried for 24 h, and placed in a vacuum oven at ambient temperature overnight. A translucent, tough polymer weighing 96.0 g is obtained. An $M_n$ of 22,000 and an $M_w$ of 46,000 are measured.

Ex. 2: Polymerization of 4-allyl-2,6-di-tert-butyl phenol (ABOH) with ethylene and octene The procedure of Example 1 is repeated except that 10 mL 4-allyl-2,6-di-tert-butyl phenol comonomer is used. After the initial oven drying procedure the translucent, tough polymer weighs 60.4 g. Analysis by GPC shows superimposible peaks from the refractive index and the UV detectors, indicating that the phenolic comonomer is randomly distributed throughout the polymer chains. Analysis by proton NMR shows a singlet at 7.0 ppm and a doublet at 2.5 ppm, which resulted from the presence of the phenolic comonomer in the backbone. An $M_n$ of 25,000 and an $M_w$ of 64,000 are measured.

CS A: Polymerization of with ethylene and octene (control with no comnonomer)

The procedure of Example 2 is repeated except that no comonomer is used. After the initial oven drying procedure the translucent, tough polymer weighs 29.1 g. An $M_n$ of 13,500 and an $M_w$ of 49,000 are measured.

Ex. 3: Polymerization of 4-allyl-2,6-di-tert-butyl phenol (ABOH) with propylene

A two-liter Autoclave reactor is charged with 657 g Isopar-E™ mixed alkanes solvent (commercially available from Exxon Chemicals Inc. under the trade designation Isopar-E™),150 g propylene, and 5 mL 4-allyl-2,6,-di-tert-butyl phenol comonomer. Hydrogen is added as a molecular weight control agent by differential pressure expansion from a 75 ml addition tank at 26 psi (2153 kPa). When the reactor is heated to the polymerization temperature of 70° C., 10 micromole each of catalyst and cocatalyst at 0.005M solutions in toluene are premixed in the drybox. The solution is transferred to a catalyst addition tank and injected into the reactor. An additional 15 micromoles each of catalyst and cocatalyst are added to the reactor at 19 minutes into the run. The polymerization conditions are maintained for 40 minutes. The resulting solution is removed from the reactor and dried in a vacuum oven with a temperature ramp and maximum temperature of 130° C. for about 15 hours to give a brittle white solid. An $M_n$ of 2,900 and an $M_w$ of 6,100 are measured.

CS B: Polymerization of propylene (control with no comonomer)

The above procedure is repeated identically except that no comonomer is used. An $M_n$ of 2,600 and an $M_w$ of 5,100 are measured.

Ex.5: Polymerization of 4-allyl-2,6-di-tert-butyl phenol (ABOH) with octene

In a dry-box, a 100 mL bottle is charged with octene (3.00 mL, density 0.715 g/mL, formula weight 112.22, 19.1 mmole), a total of 17 mL toluene, $\eta^5$-$C_5Me_4SiMe_2$(N-tBu)TiMe$_2$ (8.2 mg, formula weight 327, 0.025 mmole), B($C_6F_5$)$_3$ (12.8 mg, FW 512, 0.025 mmole), and the phenol (450 mg, formula weight 246.4, 1.83 mmole). The vial is sealed and magnetically stirred for 16 hours at ambient temperature. Methanol (2 drops) is added to the amber-orange solution, which is evaporated to a very viscous oil. Analysis by GPC indicates an $M_n$ of 3,500 and an $M_w$ of 7,200.

Ex. 6.: Dealkylation of Ethylene-Octene-ABOH Copolymer with Acid

A portion of the copolymer from Example 2 (0.890 g) is combined with 10 mL diphenyl ether in a 50 mL round-bottomed flask under nitrogen and heated to 320° C. (temperature of thermocouple placed between heating mantle and flask). As the mantle reached 260° C., 15 mg p-TsOH.H$_2$O (hydrated toluene sulfonic acid) is added. Immediate bubbling is observed, and a viscous clear solution is obtained. After 20 min (the solvent is refluxing 5 min after the acid addition) the flask is removed from the mantle, allowed to cool for 5 min, and poured into 125 mL hexane with magnetic stirring. The cloudy suspension (with fibrous white insoluble polymer) is filtered with difficulty, and washed with additional hexane. The solid is air-dried in a hood for several hours, and then placed in a vacuum oven for 15 hours. Analysis by NMR of the clear, brown pellet indicated that about 60 mole percent of the t-butyl groups has been removed. The molar ratio of di-t-butyl to mono-t-butyl to unsubstituted phenol is roughly 2:2:1.

We claim:

1. A process comprising contacting at least one monomer containing at least one double bond with at least one functionalized comonomer of Formula 1 in the presence of a transition metal complex and a non-aluminum containing cocatalyst and exposing them to reaction conditions to form a polymer of the monomer and functionalized comonomer, wherein the mole ratio of functionalized comonomer to non-aluminum containing cocatalyst is at least about 73:1 and wherein Formula 1 is:

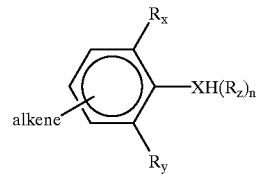

wherein:
'alkene' is a group which includes a polymerizable double bond and optionally includes other radicals which don't interfere undesirably with polymerization such as alkyl radicals, aromatic radicals, silyl radicals, or additional aromatic radicals optionally with attached XH($R_z$)$_n$ groups;
X is a divalent or trivalent heteroatom;
n is 0 to 1 to satisfy the valency of the heteroatom;
$R_x$ and $R_y$ are independently selected from hydrogen, alkyl or aromatic radicals such as Me, Et, iPr, tBu, iBu, —$CMe_2Et$, —$CMe_2Ph$, with the proviso that $R_x$ and $R_y$ are not both hydrogen and that together they are sufficient to sterically hinder the XH group from reacting with the transition metal complex; and
$R_z$ is selected from a group consisting of groups suitable for $R_x$ and $R_y$, silyl groups and combinations thereof.

2. The process of claim 1 wherein the monomer is a Hydrocarbon Olefin selected from ethylene, a monosubstituted olefin, norbornene, other strained disubstituted cyclic olefin and combinations thereof wherein a monosubstituted olefin is a double bond having more than $CH_2$ on at least one end thereof.

3. The process of claim 1 wherein the monomer is selected from a group consisting of vinyl chloride, a vinyl alkyl ester, an acrylate alkyl ester, a methacrylate alkyl ester, acrylonitrile and combinations thereof, optionally with other olefins, wherein each alkyl group has from 1 to about 30 carbon atoms.

4. The process of claim 2 wherein the monomer is a Hydrocarbon Olefin; any silyl group is selected from —$SiMe_3$, $SiEt_3$, and —$SiMe_2tBu$; X is oxygen or nitrogen; each alkyl group has from 1 to about 5000 carbon atoms; each aromatic group has less than about 100 carbon atoms; and each alkene group has at least 2 carbon atoms to about 5000 carbon atoms.

5. The process of claim 4 wherein X is oxygen, n is 0; the alkene is selected from allyl, butenyl, propenyl, and norbornenyl; the alkyl groups have from 1 to less than about 100 carbon atoms with alky groups represented by $R_x$ and $R_y$ each have at least four carbon atoms.

6. The process of claim 5 wherein the functionalized comonomer is 4-allyl-2,6-di-t-butylphenol.

7. The process of claim 6 wherein the monomer is selected from ethylene, 1-hexene, 1-octene, propylene, styrene and combinations thereof.

8. The process of claim 2 wherein the transition metal complex comprises a metallocene catalyst.

9. The process of claim 2 wherein the transition metal catalyst is ($\eta^5$—$C_5Me_4$)$SiMe_2$(N-tBu)TiMe$_2$.

10. The process of claim 2 wherein the cocatalyst comprises a boron containing compound.

11. The process of claim 10 wherein cocatalyst is B($C_5F_5$)$_3$, a boratabenzene, or a borate with an ammonium counterion.

12. The process of claim 10 wherein the molar ratio of functionalized comonomer to catalyst or cocatalyst is at least 1000.

13. The process of claim 10 wherein the molar ratio of functionalized comonomer to catalyst and to cocatalyst is at least 1000.

14. The process of claim 13 wherein the amount of functionalized comonomer ranges from 0.1 to about 50 weight percent based on total weight of the resulting polymer.

15. The process of claim 1 wherein an aluminum containing compound is present and wherein the mole ratio of functionalized comonomer to any aluminum compounds present is at least about 100:1.

* * * * *